UNITED STATES PATENT OFFICE.

KNUD ERSLEV, OF NIJMEGEN, NETHERLANDS.

PROCESS FOR IMPROVING TOBACCO.

1,331,331.  Specification of Letters Patent.  Patented Feb. 17, 1920.

No Drawing.  Application filed January 3, 1919. Serial No. 269,528.

*To all whom it may concern:*

Be it known that I, KNUD ERSLEV, a subject of the King of Denmark, and residing at 268 Groesbeekscheweg, Nijmegen, the Netherlands, have invented certain new and useful Improvements in Processes for Improving Tobacco, of which the following is a specification.

By fermentation of tobacco the process is meant which takes place when so-called "root-ripe" tobacco is piled up in large heaps in appropriate places, where it is left to itself. The nature of the processes which are taking place, has not been fully explained up to now.

Though it is rightly supposed that the action of enzyms has a leading part in this process, it is doubtful whether this is directly effected by live bacteria. At any rate it is a fact that during the fermentation important chemical conversions take place, which result in a great improvement in the quality of the tobacco.

It has been proposed, instead of allowing tobacco to ferment naturally, to control or to influence the fermentation of the tobacco by adding a pure culture of bacteria which had been isolated from fermented tobacco of superior quality, so as to give the tobacco a predetermined aroma. Such cultures have generally been made in a liquid containing tobacco extract. Apart from this inoculation with pure cultures, endeavors have been made to infuse tobacco before fermentation with liquids containing the products of growth of selected bacteria and to submit the tobacco together with the added fermentable flavor-producing material to sweating.

In this case the use of a water extract of tobacco, in some cases sterilized, in which the desired selected bacteria are cultivated, was thought to be essential.

Now, the inventor has found that for improving tobacco, it is not necessary to make use of tobacco e. g., for making a water extract serving as a culture liquid, and that often it is preferable not to do so.

Instead of a water extract of tobacco the inventor makes use of culture media, such as malt extract, milk, whey, sugar-containing liquids, etc., which after sterilization are inoculated with special bacteria, mentioned below and obtained from any suitable source.

After sufficient bacterial development and after a sufficient amount of the products of bacterial growth have been formed, the tobacco leaves to be treated are infused with said liquid, containing organic products, such as lactic acid, succinic acid, butyric acid, amido acids, etc.

The species of bacteria which may be used for this purpose are:

Ferments producing butyric acid and butyl ferments, aromatic lactic acid bacteria, (slime fermentation), peptonizing bacteria (*Bact. vulgare*, *Bact. fluor liquid.*, *Bact. polymixia*, aromatic bacteria) ester-forming species of *Torula* (*Torula aceto-œthylicus*) ester-forming fungi (*Cladosporium*).

Apart from the products formed by the action of the micro-organisms, chemical agents corresponding with one or more of said products may be added as such. Especially the addition of small quantities of butyric acid together with other products such as are produced by the kinds of bacteria above enumerated, will be found to lead to satisfactory results in this method, when used with the bacteria stated. Though a predominant lactic acid or butyric acid fermentation is detrimental, the addition of a small quantity of butyric acid may be of importance to prevent the development of other undesired fermentations.

The micro-organisms above mentioned may be isolated from various materials, such as milk, earth, hay, leaves, blossoms, roots of plants, etc., by known methods, while for some groups of the micro-organisms special methods of isolation and cultivation are advisable.

Example I: In the ordinary culture media, such as malt extract, whey, milk, sugar-containing culture liquids, etc., the above mentioned species of micro-organisms are inoculated. After a culture during the time required at a suitable temperature, liquids are obtained, which serve for the improvement of tobacco and which are used one alone or in special combinations. The process is thus proceeded with:

(*a*) The dried unfermented tobacco leaves are infused with the fresh culture liquid, or sprayed therewith, and thereupon the tobacco leaves are dried to a degree of moisture required for the process of fermentation and then fermented in the ordinary way.

(b) The process may be carried out as stated under (a), with the difference that the liquid used for moistening has by a continuous cultivation accumulated a high percentage of fermentation products.

Example II: Hay, lime-blossom, althea root and the like are heated with a suitable quantity of water for several hours. Thereupon the mass is sterilized after filtration. These liquids may be used for infection by the micro-organisms in question either with or without an addition of other substances. After cultivating during some days at a suitable temperature, liquids are obtained which serve for the improvement of tobacco. Then one proceeds as indicated under I (a) and (b).

I desire to state that no claim is made herein to the growing of bacteria of tobacco fermentation in a tobacco infusion or in a nutrient liquid containing a tobacco infusion, and then applying such product to the fermentation of tobacco.

I claim:

1. A process of improving tobacco which comprises treating tobacco with a carbohydrate-containing liquid, other than an extract of tobacco, containing a culture of at least one of the following micro-organisms, namely:—micro-organisms capable of producing butyric acid and butyl compounds from carbohydrates, aromatic lactic bacteria (slime fermentation), peptonizing bacteria (*Bact. vulgare*, *Bact. fluor liq.*, *Bact. polymixia*, aromatic bacteria), ester-forming species of *Torula* (*Torula aceto-œthylicus*), ester-forming fungi, (*Cladosporium*); whereupon the tobacco thus treated is dried to the desired degree of moisture, and thereafter subjected to the process of fermentation, whereby the flavor and aroma and the burning qualities of the tobacco are improved more than in the ordinary tobacco fermentation.

2. A process of improving tobacco which comprises treating tobacco with a tobacco-free liquid containing carbohydrate and containing a culture of at least one of the following micro-organisms, namely:—micro-organisms capable of producing butyric acid and butyl compounds from carbohydrates, aromatic lactic acid bacteria (slime fermentation), peptonizing bacteria (*Bact. vulgare*, *Bact. fluor liq.*, *Bact. polymixia*, aromatic bacteria), ester-forming species of *Torula* (*Torula aceto-œthylicus*), ester-forming fungi (*Cladosporium*); such liquid also containing a relatively great quantity of the chemical products which can be produced by said micro-organisms, and then drying the tobacco thus treated to the desired degree of moisture, and subjecting the same to the process of fermentation, whereby the flavor and aroma of the tobacco are improved more than in natural tobacco fermentation, and the burning quality is improved.

3. A process of improving tobacco which comprises treating tobacco with a carbohydrate-containing liquid, other than an extract of tobacco, containing a culture of at least one of the following micro-organisms, namely:—micro-organisms capable of producing butyric acid and butyl compounds from carbohydrates, aromatic lactic bacteria (slime fermentation), peptonizing bacteria (*Bact. vulgare*, *Bact. fluor liq.*, *Bact. polymixia*, aromatic bacteria), ester-forming species of *Torula* (*Torula aceto-œthylicus*), ester-forming fungi, (*Cladosporium*); whereupon the tobacco thus treated is dried to the desired degree of moisture.

In testimony whereof I affix my signature.

KNUD ERSLEV.